United States Patent
Bertini

[11] Patent Number: 5,967,581
[45] Date of Patent: Oct. 19, 1999

[54] GRIPPER ASSEMBLY WITH IMPROVED CENTER REPEATABILITY

[76] Inventor: Millo Bertini, 679 Garden St., Trumbull, Conn. 06611

[21] Appl. No.: 08/985,013

[22] Filed: Dec. 4, 1997

[51] Int. Cl.⁶ .............................. B66C 1/44; B25J 15/08
[52] U.S. Cl. ........................... 294/88; 294/119.1; 901/37
[58] Field of Search .................................. 294/88, 119.1, 294/116; 901/37

[56] References Cited

U.S. PATENT DOCUMENTS

| | | | |
|---|---|---|---|
| 4,211,123 | 7/1980 | Mack | 294/88 |
| 4,593,948 | 6/1986 | Borcea et al. | |
| 4,723,806 | 2/1988 | Yuda | 294/88 |
| 4,865,375 | 9/1989 | Laub et al. | 294/88 |
| 4,874,194 | 10/1989 | Borcea et al. | 901/37 |
| 4,892,344 | 1/1990 | Takada et al. | |
| 4,913,481 | 4/1990 | Chin et al. | |
| 5,085,480 | 2/1992 | Jackson | 294/116 |
| 5,090,757 | 2/1992 | Huber et al. | |
| 5,125,708 | 6/1992 | Borcea et al. | |
| 5,190,334 | 3/1993 | Sawdon | |
| 5,620,223 | 4/1997 | Mills | |

FOREIGN PATENT DOCUMENTS

| | | | |
|---|---|---|---|
| 265-814 | 5/1988 | European Pat. Off. | 294/88 |
| 446-027 | 1/1992 | European Pat. Off. | 901/37 |
| 3325-921 | 1/1985 | Germany | 294/119.1 |

Primary Examiner—Christopher P. Ellis
Assistant Examiner—Paul T. Chin
Attorney, Agent, or Firm—Fattibene & Fattibene; Arthur T. Fattibene; Paul A. Fattibene

[57] ABSTRACT

A gripper assembly for use in automated machines or robotics having a piston driven activator for effecting corresponding linear parallel displacement of opposed finger carriers and associated gripper fingers between a retracted and protracted position with improved center repeatability that is achieved by keying or maintaining the piston driven activator firmly centered relative to the gripper housing in a precise and positive manner that is least effected by wear. The gripper assembly may also be rendered fluid tight to operate in a fluid environment by providing seals between the opposed reciprocating finger carriers and the gripper housing as the finger carriers are displaced in a linear parallel manner between a protracted and retracted position.

18 Claims, 5 Drawing Sheets

6,967,581

GRIPPER ASSEMBLY WITH IMPROVED CENTER REPEATABILITY

FIELD OF THE INVENTION

This invention relates to gripper assemblies for use in automative or robotic type machinery, and more specifically to a gripper assembly constructed to provide for improved accuracy and/or of center repeatability.

BACKGROUND OF THE INVENTION

Heretofore, numerous efforts have been made to develop a gripper assembly for use in various types of robotic or automated tool machines. U.S. Pat. Nos. 4,892,344; 4,913,481; 4,593,948; 5,090,757; 5,125,708; 5,190,334 and 5,620,223 illustrate some of the known type grippers for use in robotic tool machines which seek to provide for parallel linear movement. Generally, such gripper assembly required the movable component parts to be machined to very close tolerance in order to achieve the desired degree of precision or accuracy. However, in time and use, the precision of the known gripper assemblies will progressively lessen due to wear between the movable parts. As a result, in many of the known gripper constructions, it has been noted that the center repeatability of the movable fingers progressively diminishes over time because of wear. When this occurs, the fingers may not equally open or close in a simultaneous manner as desired, thus resulting in inaccuracies in its positioning of a workpiece. There thus exists an ever present problem of constructing a gripper assembly capable of maintaining accurate and precise center repeatability over a considerable period of time.

BRIEF SUMMARY OF THE INVENTION

An object of this invention is to provide a gripper assembly constructed in a manner to provide improved center repeatability over the life of the assembly.

Another object is to provide a gripper assembly which is sealed liquid tight for rendering the use of the gripper assembly in a liquid environment.

Another object of this invention is to provide a gripper assembly capable of operating under conditions of either negative or positive atmospheric pressure.

The foregoing objects and other features and advantages of this invention are attained by a gripper assembly that includes a gripper housing and an associated superposed cylinder housing having a reciprocating piston therein. Connected to the piston is a piston rod or stem which extends into the gripper housing and has connected thereto a cam activator or wedge. The cam activator or wedge is provided with a pair of diagonally outwardly projecting inclined cams and diagonally opposite, outwardly projecting keys arranged to engage a corresponding keyway formed in the opposed sides of the gripper housing. Operatively associated with the cam activator or wedge are a pair of opposed finger carriers slidably disposed within the gripper housing for moving between a retracted and protracted position. Each of the respective finger carriers is provided with an inclined groove for receiving the corresponding inclined cam projecting laterally from the cam activator or wedge.

In one form of the invention, the respective finger carriers are each provided with a circumscribing sealing ring to form a liquid tight seal between the reciprocating finger carriers and the gripper housing, and a vent is provided for venting the interior of the gripper housing when operating under either a negative or positive atmospheric pressure. The arrangement is such that when the piston is actuated, the cam activator or wedge is displaced accordingly to effect the translation of the associated finger carriers between a retracted and protracted position wherein center repeatability is accurately maintained by the keying of the reciprocating cam activator relative to the gripper housing within very close and accurate tolerances. The keying of the cam activator or wedge relative to the housing provides for a stronger and more precision controlled movement of the activator or wedge so as to enhance the center repeatability of the gripper assembly.

In another form of the invention, the cam activator or wedge is provided in a pair of inclined slots to which the respective finger carriers are pinned, whereby the finger carriers are displaced between retracted and protracted position by the camming action of the inclined slots acting on the finger carrier pins. In this form of the invention, the cam activator or wedge is provided with opposed bearing surfaces arranged to be closely confined between the opposed end walls of the gripper housing to insure the accuracy of the center repeatability of the associated finger carriers over the life of the gripper.

IN THE DRAWINGS

DETAILED DESCRIPTION

Figure 2:
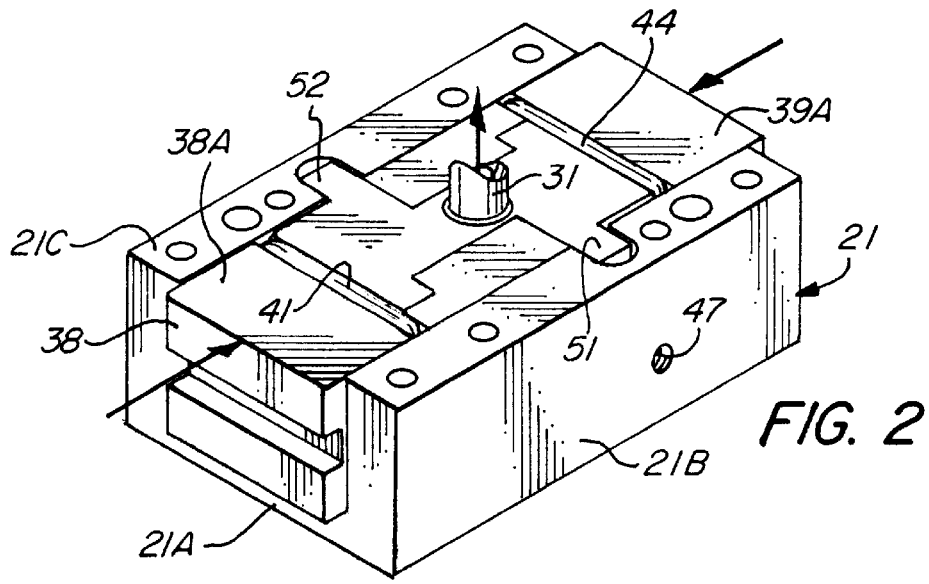
FIG. 2 is a partial perspective view of the gripper housing portion illustrating the gripper finger carriers in the retracted position.
Figure 3:
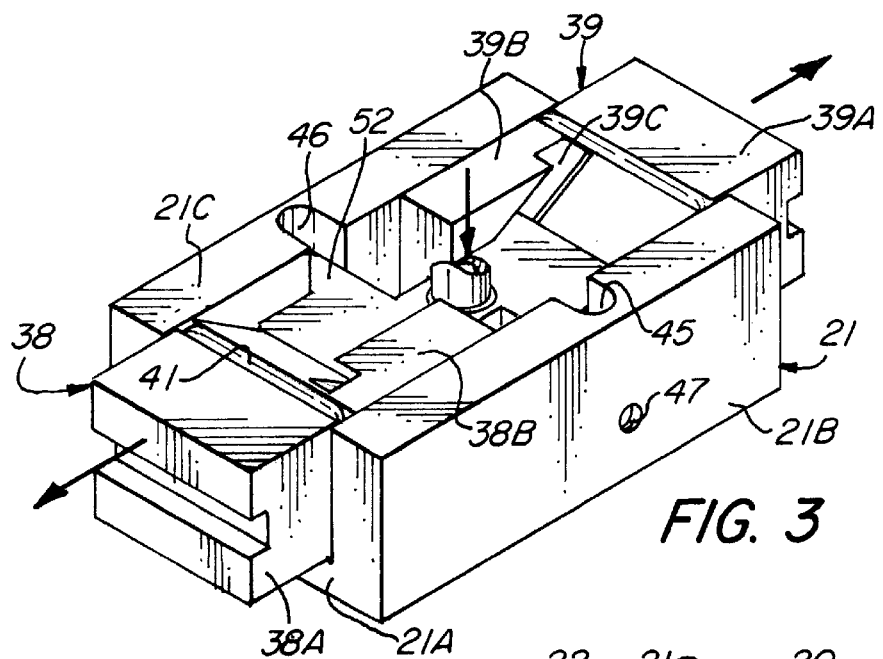
FIG. 3 is a view similar to that of FIG. 2 illustrating the gripper finger carriers in the protracted position.
Figure 1:
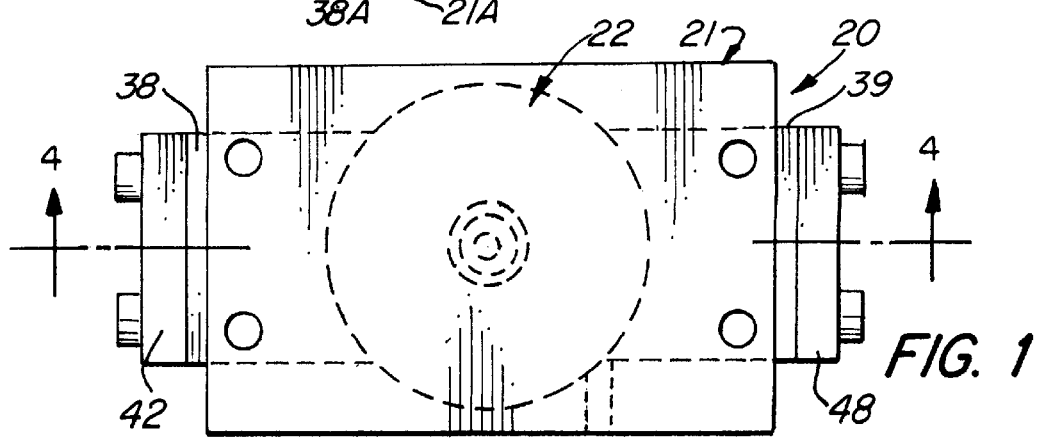
FIG. 1 is a plan view of a gripper assembly embodying the invention.

Referring to the drawings, there is illustrated in FIGS. 1 to 6 a gripper assembly 20 embodying one form of the invention described herein. The gripper assembly 20 includes a gripper housing 21 and a connected cylinder housing 22, which are secured to one another by means of suitable fasteners, e.g. machine bolts 23.

The cylinder housing comprises a block 24 having a cylinder bore 25 formed therein, defining a piston chamber sealed by an end closure 26. The end closure 26 is provided with an outer peripheral groove 27 forming a seat for receiving a sealing O ring 28 and a central opening 29. Reciprocally mounted within the cylinder bore 25 is a piston 30 and a connected piston stem 31. In the illustrated embodiment, the piston stem 31 is shown as a tubular member which is internally threaded, whereby the piston 30 is secured to the piston stem 31 by a threaded bolt 32. The arrangement is such that the piston stem 31 extends through the central opening 29 of the end closure 26, and is suitably sealed relative thereto by a sealing O ring 33. The other end of the piston stem 31 is secured to a cam activator or wedge 34 by means of a thread bolt 35.

In accordance with this invention, the piston 30 is activated by fluid pressure, e.g. compressed air or hydraulic fluid. Accordingly, the cylinder housing 22 is provided with a pair of fluid conduits or bores 36 and 37 for directing a fluid pressure to and from the opposite sides of the piston 30. It will be understood that suitable pressure supply conduits (not shown) are detachably connected to the respective bores 36, 37 for directing an actuating fluid pressure to either side of the piston 30 in a controlled manner to reciprocally actuate the piston 30 within the cylinder bore 25.

Figure 5:
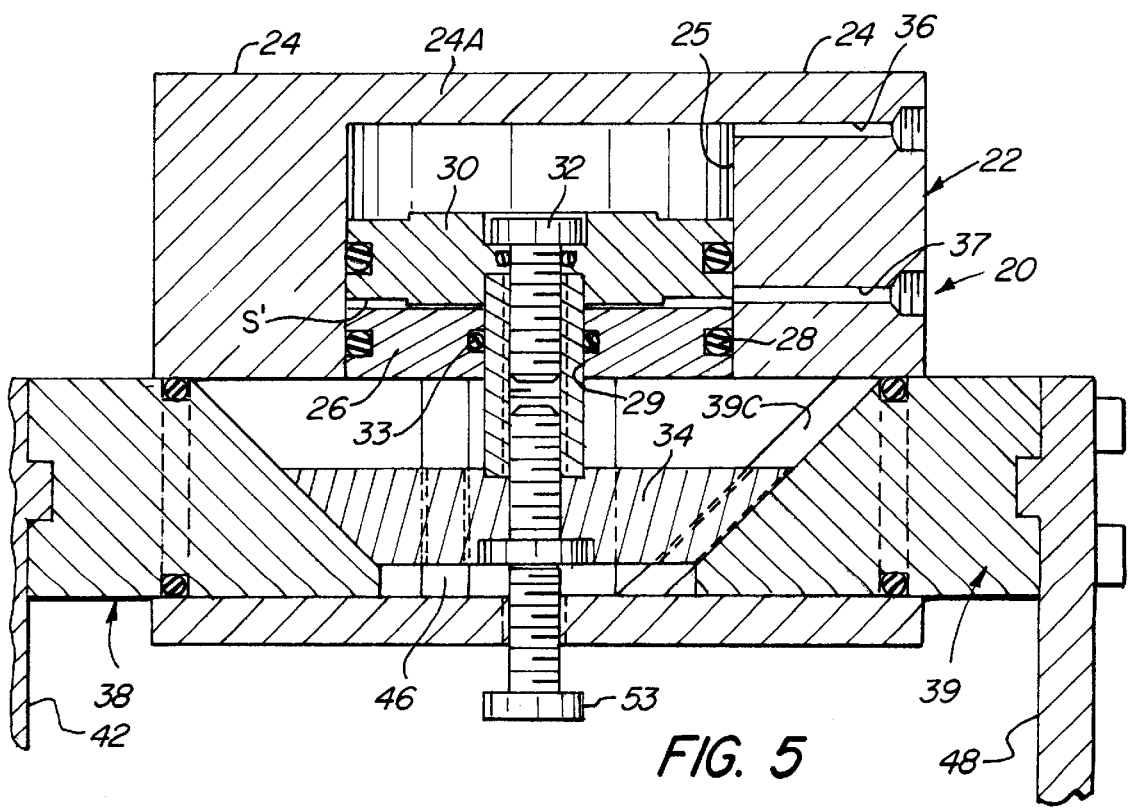
FIG. 5 is a sectional side view similar to FIG. 4, illustrating the parts in the protracted position.

As shown, the piston 30 is provided with a peripheral top and bottom surface of a slightly reduced thickness as best seen at 30A, 30B so as to define a slight space S between the end wall portion 24A of block 24, and piston 30 which is disposed in communication with fluid conduit or bore 36. Surface 30B of the piston is similarly formed to define a space S' between the piston 30 and the end closure 26 when the piston 30 is disposed in the position as shown in FIG. 5. In the lowered position of the piston, as in FIG. 5, the space S' is in communication with conduit or bore 37.

Figure 6:
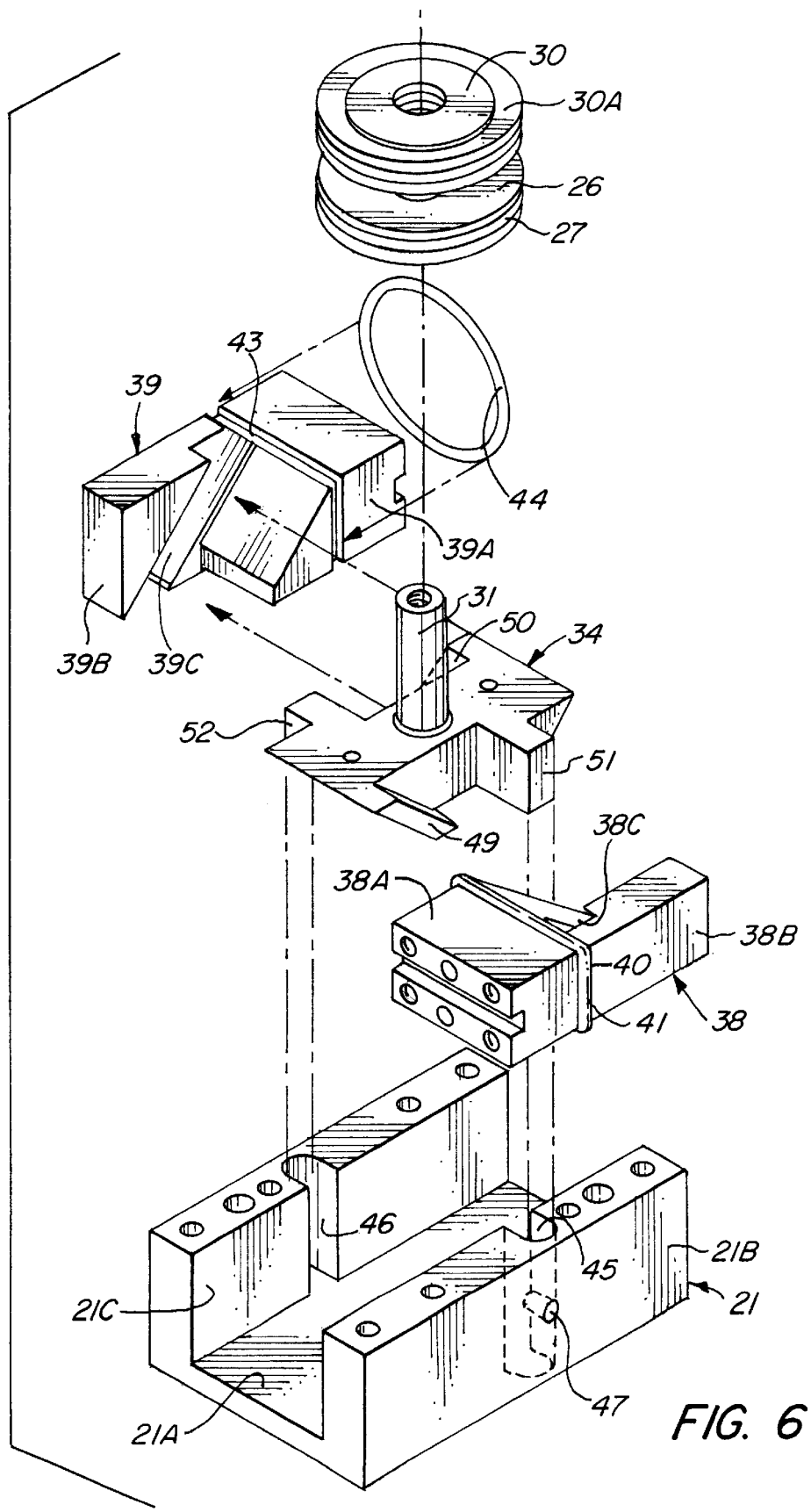
FIG. 6 is a partial exploded perspective view of the gripper of FIGS. 1 to 5.
Figure 7:
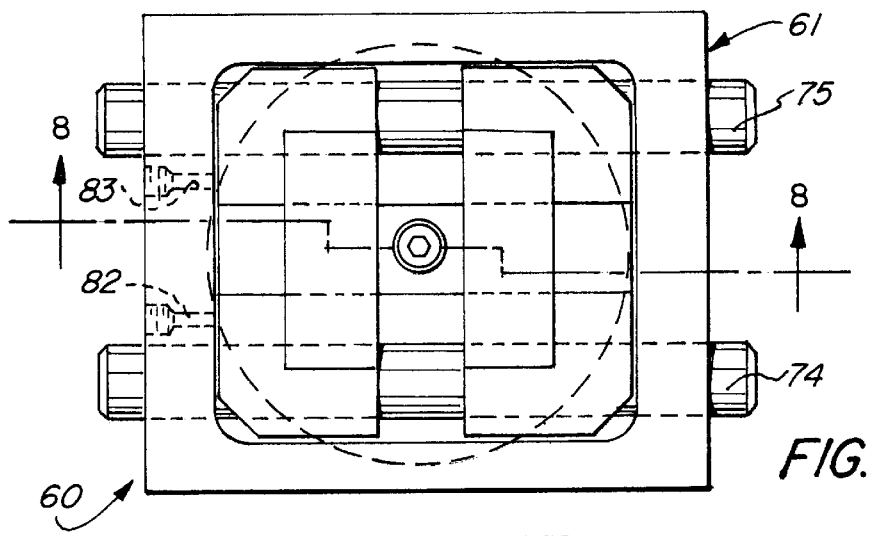
FIG. 7 is a plan view of a modified form of the gripper assembly.

The gripper housing 21 is best seen in FIG. 6 and includes a bottom wall 21A having connected thereto a pair of opposed side walls 21B, 21C vertically disposed to define a generally U shaped housing. Slidably disposed between the opposed sidewalls 21B, 21C of the gripper housing are a pair of oppositely disposed finger carriers 38, 39. Each of the respective finger carriers F comprises a machined component which are similarly constructed, but opposite in hand.

As illustrated, finger carrier 38 includes a mounting head 38A having a width corresponding to the width defined by the distance between the inside faces of the gripper housing side walls 21B, 21C. Connected to the mounting head 38A and extending normal thereto is a leg portion 38B which is arranged to be disposed in sliding relationship relative to the inside surface of side wall 21B. Formed in the inside surface of the leg portion 38B is an inclined groove 38C. Circumscribing the mounting head 38A is a groove 40 defining a seat for retaining a sealing O ring 41. Adapted to be mounted on the face of the mounting head 38A of the finger carrier 38 is a gripping finger 42.

Finger carrier 39 is similarly constructed, but opposite in hand. As best shown in FIG. 6, the finger carrier 39 includes a mounting head 39A having a width substantially equal in width to the distance between side walls 21B, 21C of the gripper housing 21 and a connected leg portion 39B. The inside surface of leg portion 39B is provided with an inclined groove 39C. Circumscribing the mounting head is a sealing groove 43 defining a seat for receiving a sealing O ring 44.

In accordance with this invention, the inside surface of the respective side walls 21B, 21C of the gripper housing 21 are each formed with a vertically disposed groove or keyway 45, 46. As shown, the respective keyways 45, 46 are diagonally disposed or offset with respect to one another. As best seen in FIG. 6, a vent opening 47 is disposed in communication with keyway 45. A gripper finger 48 is mounted on the face portion of the corner mounting head 39A.

Figure 4:
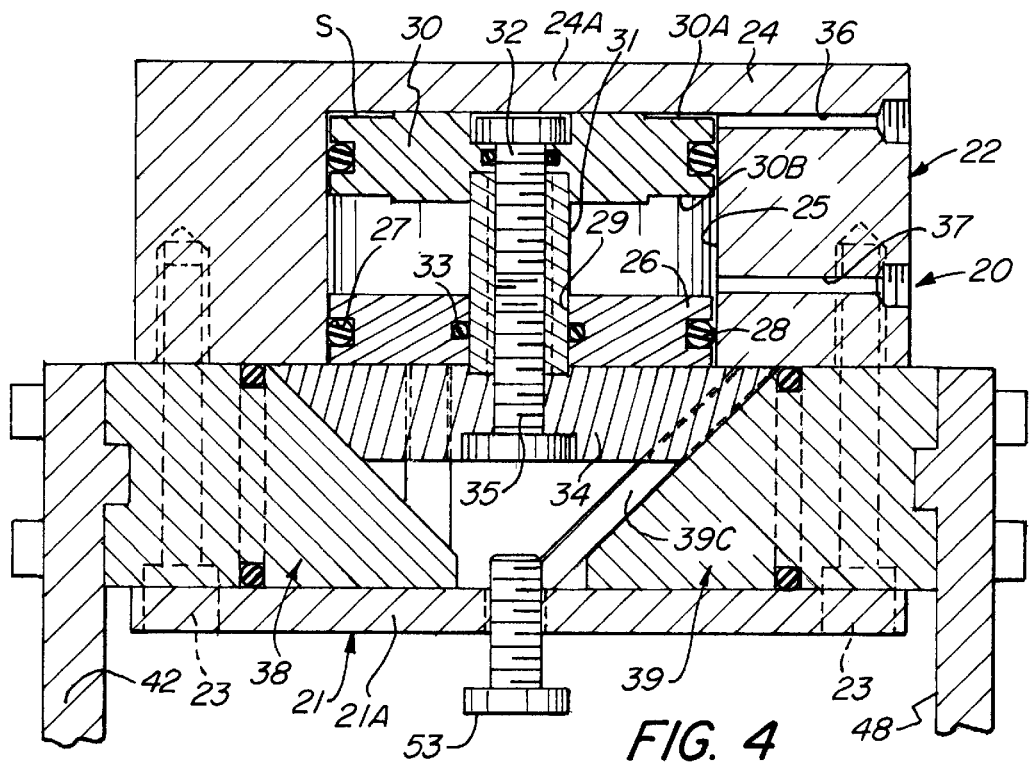
FIG. 4 is a section view taken along line 4—4 on FIG. 1 illustrating the parts in the retracted position.

In the assembled position, the respective finger carriers 38, 39 are slidably disposed in the gripper housing within the opposed sidewalls 21B, 21C; and are arranged to slide relative to the gripper housing 21 so as to effect displacement of the respective gripping fingers 42, 48 between a retracted position as shown in FIG. 4 and a protracted position as shown in FIG. 5.

To render the finger carriers 38, 39 responsive to the actuation of the piston 30, the cam activator or wedge 34 connected to the piston stem 31, operatively connected to the respective finger carriers 38, 39. As best seen in FIG. 6, the cam activator or wedge 34 includes a machined component which includes diametrically opposed inclined cams or camming splines 49 and 50 which are adapted to be received in the inclined grooves 38C, 39C respectively of carriers 38, 39. The cam activator or wedge 34 is also provided with opposite, outwardly extending keys 51, 52, arranged to be received in the offset keyways 45, 46 respectively, formed in the sidewalls of the gripper housing 21 to guide the cam activator 34 in a firm and positive manner relative to the gripper housing 21 as the piston 30 is actuated.

With the construction described, it will be apparent that upon the actuation of the piston 30, the cam activator or wedge 34, reciprocating in unison with the piston 30, will effect the lateral displacement of the respective finger carriers 38, 39 and associated gripper fingers 42, 48 between the retracted and protracted positions to effect the gripping and releasing of a workpiece (not shown). As the cam activator or wedge 34 is firmly centered within the gripper housing by the opposed keys 51, 52 riding in key ways 45, 46, lateral play or deviation of the cam actuator 34 from its central position is prohibited. As a result, the center repeatability of the moving fingers 42, 48 is assured over the life of the gripper.

To control the relative displacement of the finger carriers and adjust the corresponding linear displacement of the gripping fingers 42, 48, an adjustment means is provided. As best seen in FIGS. 4 and 5, the adjusting means comprises an adjusting screw 53 which extends through the bottom wall 21A of the gripper housing 21. The adjusting screw 53, as best seen in FIGS. 4 and 5, functions as a stop to limit the vertical movement of the activator or wedge 34 which, in turn, controls the rectilinear displacement of the respective gripper fingers 42, 48 accordingly.

With the construction of the gripper assembly 20 herein described, it will be noted that center reliability, i.e. the movement of the gripper fingers 42, 48 between retracted or protracted positions, is maintained virtually equal or uniform since the travel of the activator or wedge 34 is positively centered and closely guided in its vertical movement by the interaction of the projecting keys 51, 52 being closely confined in keyways 45, 46. The firm centering of the activator by means of the keys and associated keyways prevents any relative lateral play or movement between the activator or wedge 34 and the gripper housing 21. Thus, the displacement of the respective carriers 38, 39 are equally displaced in moving between a retracted and protracted position, allowing the associated fingers 42, 48 to uniformly close onto or release a workpiece in an arcuate and precise manner, whereby the center repeatability of the gripper can be substantially extended over the life of the gripper 20.

As the moving components are sealed fluid tight, as herein described, it will be apparent that the gripper 20 can be rendered operative in a liquid environment. In such an event, the vent 47 is arranged to be connected to a suitable venting conduit (not shown) to extend above the level of the liquid environment for venting the interior of the gripper housing 21 during operation.

The described gripper assembly is also rendered readily operative in a negative or positive pressure environment whereby the vent 47 may be connected to either a negative or positive pressure source accordingly.

FIGS. 7 to 10 illustrate another embodiment of the invention. In this form of the invention, the gripper assembly 60 includes a gripper housing 61 formed as a rectilinear housing having a pair of opposed side walls 61A, 61B and opposed end walls 61C, 61D interconnected to a bottom wall 61E.

Figure 8:
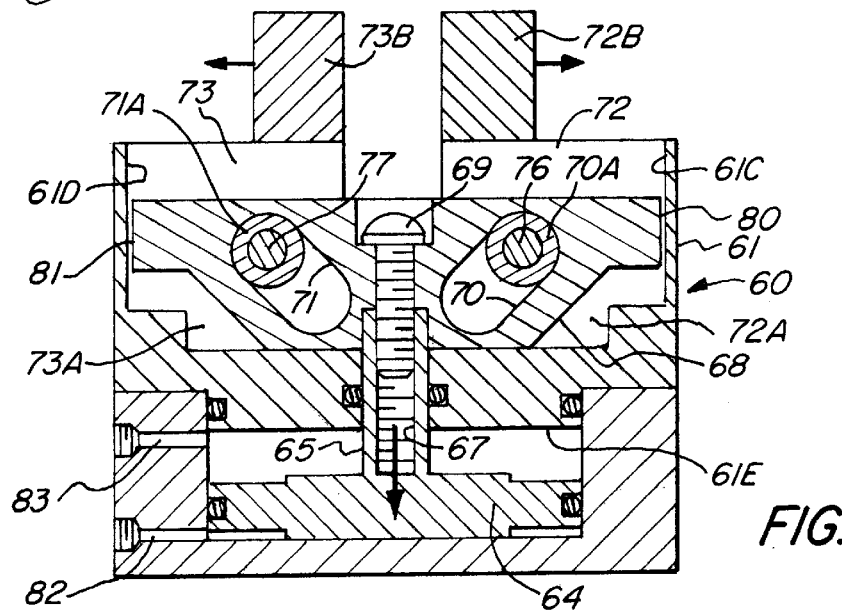
FIG. 8 is a sectional side view of the gripper assembly taken along line 8—8 on FIG. 7, illustrating the parts in the protracted position.
Figure 9:
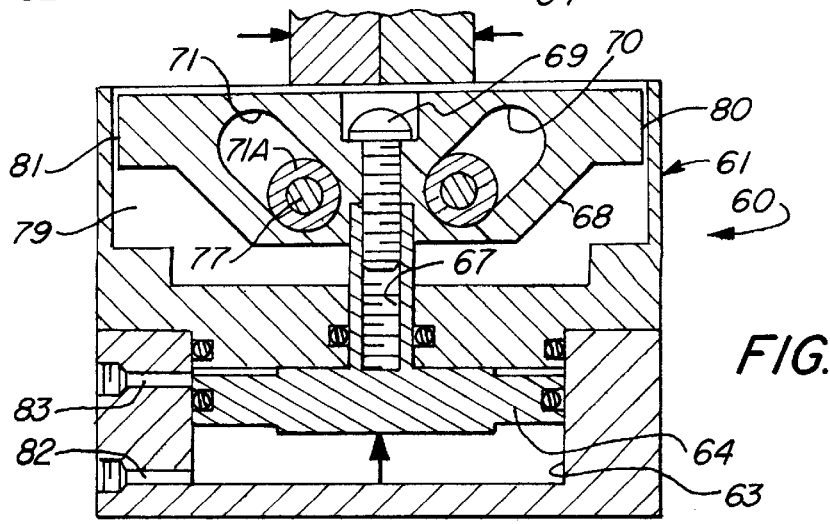
FIG. 9 is a sectional side view similar to FIG. 8, but illustrating the parts in a retracted position.

Connected to the bottom wall 61E as viewed in FIGS. 8 and 9 is a piston housing 62 formed with a central bore 63 to define a cylinder chamber for reciprocally receiving a piston 64. Connected to the piston 64 is a piston stem 65 arranged to extend through an opening 66 formed in the bottom wall 61E of the gripper housing 61. The piston 64 is constructed similar to that described with respect to the piston 30 hereinbefore described. As shown best in FIGS. 8 and 9, the piston stem 65 is provided with an internal thread bore 67.

In this form of the invention, a modified activator or wedge 68 is connected to the piston stem 67 by a bolt 69. As shown, the activator 68 is provided with a pair of inclined slots 70 and 71 for receiving a cam roller 70A and 71A respectively. Connected to the opposed ends of the cam actuator or wedge 68 are the finger carriers 72 and 73.

Figure 10:
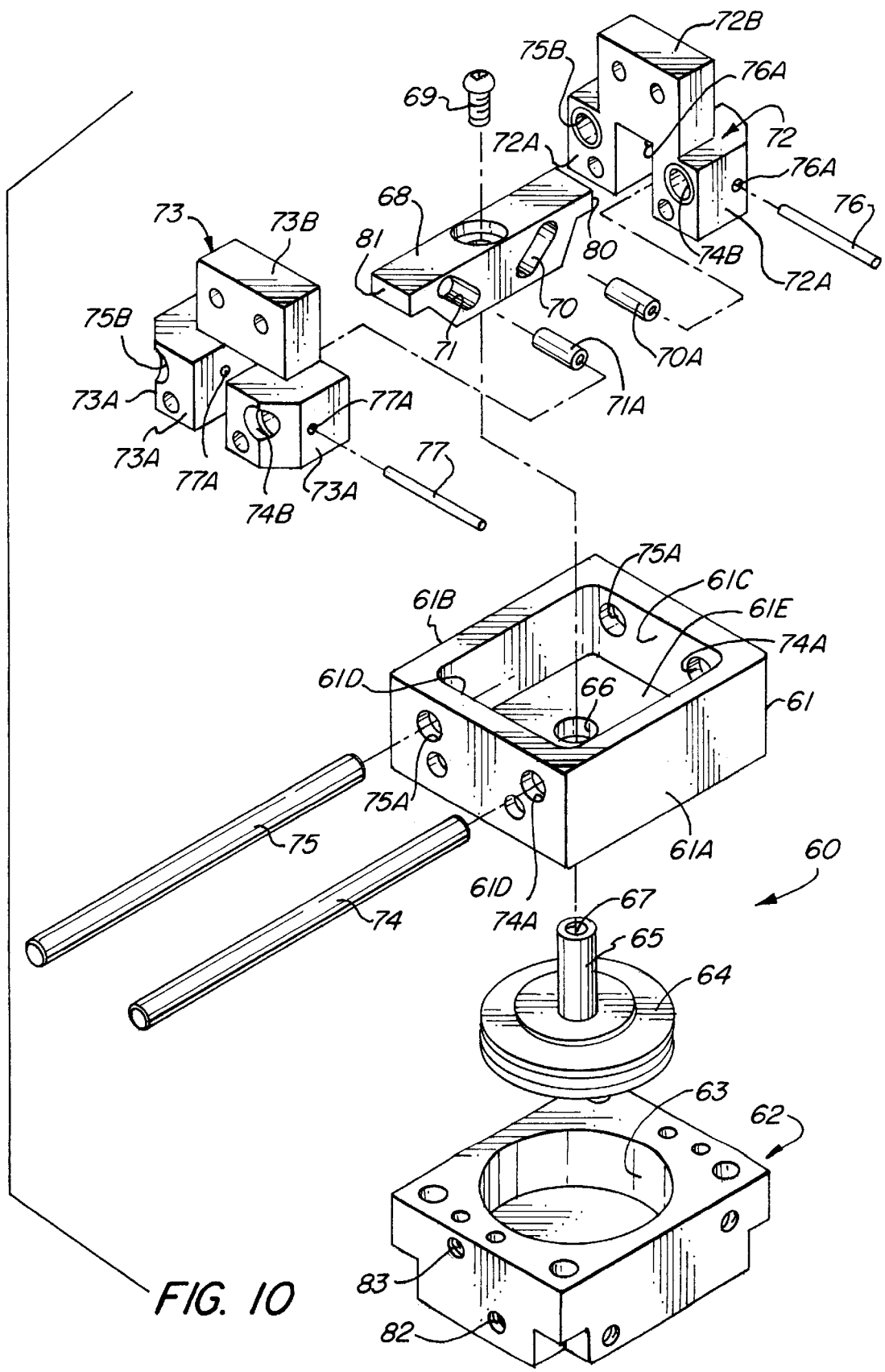
FIG. 10 is a perspective exploded view of the gripper assembly of FIGS. 7 to 9.

As shown in FIG. 10, the respective finger carriers 72, 73 are illustrated as a machine component having opposed spaced apart mounts 72A, 72A and 73A, 73a respectively. The respective mounts 72A, 72A and 73A, 73A are disposed in alignment so as to be reciprocally mounted on a pair of guide rods 74, 75. The spacing between the respective mounts 72A, 72A and 73A, 73a of the respective finger carriers 72 and 73 is such so as to receive therebetween the opposed end portion of the wedge 68. The respective finger carriers 72 and 73 are connected to the activator wedge 68 by connecting pins 76 and 77 which extend through aligned openings 76A, 76A and 77A, 77A of the respective finger carriers 72, 73 and through the corresponding cam rollers 70A, 71A disposed within the respective inclined slots 70, 71. Straddling the respective mounts 72A, 72A and 73A, 73A is the finger 72B and 73B respectively.

In the assembled arrangement, the respective finger carriers 72, 73 are slidably on guide rods 74, 75 which are extended through aligned holes 74A, 74A and 75A, 75A formed in the opposed end walls 61C, 61D of the gripper housing, and the aligned holes 74B 74B and 75B, 75B formed on the respective mounts 72A, 72A and 73A, 73A of the finger carriers 72, 73.

In accordance with the invention, the inside surface of the respective end walls 61C, 61D of the gripper housing defines a bearing surface. The opposed end surfaces 80 and 81 of the cam activator 68 are also formed as a bearing surface arranged to be disposed in contiguous bearing sliding relationship relative to the inside or bearing surface of the respective end walls 61C and 61D, as seen in FIGS. 8 and 9. The arrangement is such that the end bearing surfaces 80 and 81 of the cam activator 68, so disposed relative to the inside surface of end walls 61C, 61D, maintains the cam activator 68 firmly centered to insure the center repeatability of the finger carriers.

Extending through a side wall of the piston housing 62 are a pair of fluid passageways 82, 83, to which a fluid supply conduit (not shown) may be connected for directing a fluid actuating medium to either one side or the other of the piston 64 to effect the actuation of the piston. Thus, it will be apparent that when the piston 64 is actuated by alternately directing a fluid pressure to one side or the other, the activator or wedge 68 is reciprocated within the gripper housing 61 accordingly. When the activator or wedge 68 is in its lowermost position within the gripper housing 61, as shown in FIG. 8, the cam rollers 70A, 71A are disposed adjacent the upper end of the inclined cam slots 70 and 71 causing the respective finger carriers 72 and 73 to shift toward the protracted position. When the activator or wedge 68 is reciprocated to its uppermost position as shown in FIG. 9, the associated finger carriers 72 and 73 are shifted toward the retracted position as the cam rollers 70A, 71A are bottomed in their corresponding inclined slot 70 and 71. Inclining the inclined slots 70 and 71 in the opposite direction effects the reverse actions of the finger carriers 72 and 73.

In this form of the invention, the activator or wedge 68 is firmly guided and firmly centered within the gripper housing 61 as it reciprocates by means of the bearing surfaces 80 and 81 being closely confined between the inside surfaces of the end walls 61C, 61D.

While the present invention has been described with respect to a plurality of embodiments, it will be apparent that certain modifications and variations may be made without departing from the spirit or scope of this invention.

What is claimed is:

1. A gripper assembly comprising:
   a gripper housing and an associated piston and cylinder,
   said gripper housing having opposed wall portions,
   said piston having a stem projecting into said gripper housing,
   a cam activator connected to said piston stem within said gripper housing between said opposed wall portions,
   a pair of opposed finger carriers cammingly connected to said cam activator for movement between a retracted and protracted position,
   said cam activator having opposed outwardly extending keys projecting in the direction of said opposed wall portions,
   said opposed wall portions each having a keyway formed therein, and
   said outwardly extending keys being adapted to be received in an adjacent corresponding keyway whereby said cam activator is firmly guided and centered as it reciprocates within said gripper housing in response to the actuation of said piston.

2. A gripper assembly as defined in claim 1 and including means for adjusting the stroke of said piston to control the relative displacement of said finger carriers between a protracted and retracted position.

3. A gripper assembly as defined in claim 1 wherein said cam activator includes:
   a pair of oppositely disposed inclined cam splines,
   and each of said finger carriers having a complementary groove for receiving a corresponding cam spline whereby actuation of said cam activator effects the translation of said finger carriers between a retracted and protracted position.

4. A gripper assembly as defined in claim 1 wherein each of said finger carriers includes a mounting head having a width corresponding to the distance between said opposed wall portions,
   a leg connected to said mounting head extending between said cam activator and a wall portion of said gripper housing,
   and said complementary groove being formed in said leg.

5. A gripper assembly as defined in claim 4 and including a sealing means circumscribing said mounting head of the respective finger carriers forming a fluid tight seal between said finger carrier and said gripper housing.

6. A gripper assembly as defined in claim 5 and including means for venting the interior of said gripper housing.

7. A gripper assembly as defined in claim 5 and including a venting means disposed in communication with one of said keyways.

8. A gripper assembly comprising:

a gripper housing and a piston housing connected to said gripper housing, said piston housing including a bore defining a piston chamber, a piston reciprocally mounted within said piston chamber, a piston stem connected to said piston, said piston stem extending into said gripper housing, said gripper housing including a pair of spaced apart opposed walls, a cam activator reciprocally disposed within said gripper housing and between said walls, said cam activator being connected to said piston stem, oppositely disposed finger carriers connected to said cam activator for movement between a retracted and protracted position, and means for keying said cam activator to said opposed walls whereby said cam activator is maintained firmly centered with said gripper housing as said piston and connected cam activator reciprocates within their respective housings.

9. A gripper assembly as defined in claim 8 and including an adjusting screw extending into said gripper housing for limiting the stroke of said piston and connected cam activator.

10. A gripper assembly as defined in claim 8 wherein each of said finger carriers includes:

a mounting head having a width complementing the spacing between said opposed walls, a leg connected to said mounting head and extending between said cam activator and an adjacent wall of said gripper housing, complementary camming means interconnecting each of said finger carriers relative to said cam activator whereby said finger carriers are rectilinearly displaced between a retracted and protracted position as said cam activator is reciprocally displaced within said gripper housing.

11. A gripper assembly as defined in claim 10 wherein said complementary cam means includes:

an inclined spline projecting outwardly on opposite sides of said cam activator, and a complementary inclined groove formed on each leg of said finger carriers for mating with its corresponding spline so that reciprocation of said cam activator effects relative lateral displacement of said finger carriers between a retracted and protracted position.

12. A gripper as defined in claim 8 wherein said keying means includes a projecting key and a complementary keyway oppositely formed on said cam activator and opposed walls of said gripper housing.

13. A gripper assembly as defined in claim 10 and including a sealing member circumscribing said mounting head to define a fluid tight seal between said mounting head and gripper housing.

14. A gripper assembly as defined in claim 13 and including means for venting said gripper housing.

15. A gripper assembly comprising:

a gripper housing having opposed walls, a piston housing connected to said gripper housing, said piston housing having a cylinder chamber formed therein, a piston reciprocally mounted within said cylinder chamber, a piston stem connected to said piston and extending into said gripper housing, a cam activator connected to said piston stem, means for maintaining said cam activator centered between said opposed walls within said gripper housing, a pair of finger carriers connected to said cam activator in relative camming relationship therewith for effecting relative movement of said finger carriers between retracted and protracted positions as said cam activator is displaced within said gripper housing, wherein said centering means comprises complementary members including a key and keyway for keying said cam activator relative to said gripper housing for maintaining said cam activator firmly centered between said opposed walls, one of said complementary members being formed on said cam activator and the other of said complementary members being formed on said opposed walls of said gripper housing.

16. A gripper assembly comprising:

a gripper housing having opposed walls, a piston housing connected to said gripper housing, said piston housing having a cylinder chamber formed therein, a piston reciprocally mounted within said cylinder chamber, a piston stem connected to said piston and extending into said gripper housing, a cam activator connected to said piston stem, means for maintaining said cam activator centered between said opposed walls within said gripper housing, a pair of finger carriers connected to said cam activator in relative camming relationship therewith for effecting relative movement of said finger carriers between retracted and protracted positions as said cam activator is displaced within said gripper housing, wherein said centering means includes opposed bearing surfaces formed on the opposed ends of said cam activator whereby said bearing surfaces are disposed in sliding bearing relationship with said opposed walls of said gripper housing for maintaining said cam activator centered between said opposed walls.

17. A gripper assembly as defined in claim 16 wherein said cam activator includes a pair of inclined slots, said slots having one end converging toward one another and the other end thereof diverging from one another, a cam roller disposed in each of said slots, and said finger carrier being pivotally connected to each of said cam rollers.

18. A gripper assembly as defined in claim 17 and including a pair of spaced apart guide rods connected between said opposed walls, and said finger carriers being slidably mounted on said guide rods.

* * * * *